Patented Feb. 3, 1942

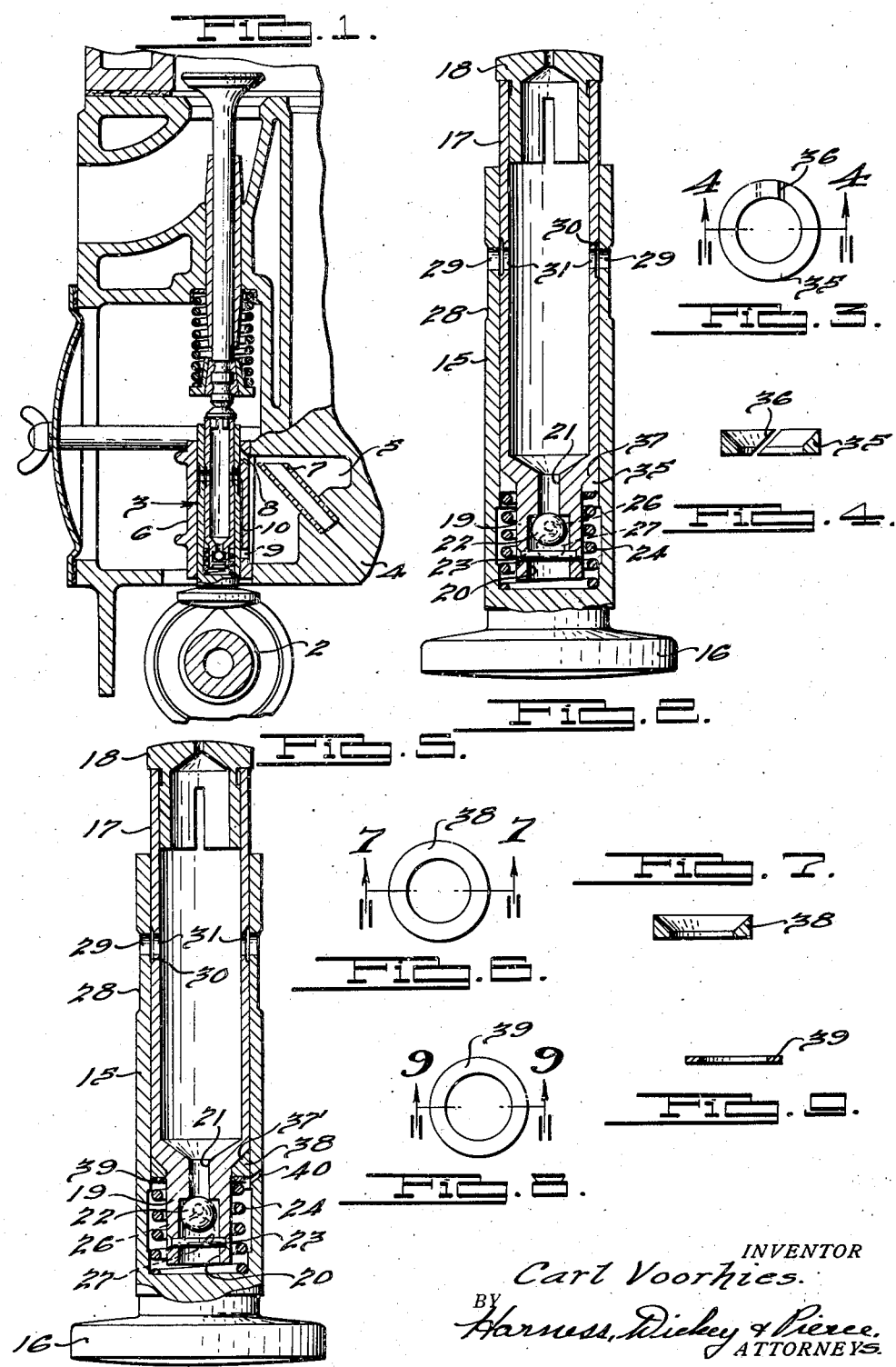

2,272,074

UNITED STATES PATENT OFFICE 2,272,074

VALVE TAPPET

Carl Voorhies, Detroit, Mich., assignor to Eaton Manufacturing Company, Cleveland, Ohio, a corporation of Ohio Original application June 4, 1934, Serial No. 728,813. Divided and this application September 15, 1939, Serial No. 295,104

8 Claims. (Cl. 123—90)

This invention relates to automatic compensating tappets for operating such parts as the intake or exhaust valves of internal combustion engines and more especially relates to improvements in the construction and arrangement of tappets of such character, and is a division of my application for Letters Patent of the United States for improvements in compensating hydraulic tappets for internal combustion engines, filed June 4, 1934, and serially numbered 728,813, issued April 8, 1941, as Patent Number 2,237,854.

The principal object of the invention is to provide an improved automatic compensating mechanism for tappets especially adapted for operating movable parts of an internal combustion engine.

Another object is to provide a novel plunger construction for hydraulic compensating tappets which includes novel means for providing a seal between the plunger and the cylinder thereof.

Further objects of the invention include the provison of a tappet of the type described including a cylinder and a plunger together with novel means for sealing the plunger to the cylinder and providing means for effecting an automatic and positively controlled leak-down of the plunger in the cylinder; the provision of a construction as above described in which the construction and arrangement of the seal and of the leak-down means eliminates the necessity for selective or other exceedingly accurate fit between the plunger and the cylinder; the provision of a construction as above described in which the leak-down means is formed as a part of the sealing means; the provision of a construction as above described in which the sealing means includes a ring of soft and ductile material arranged for continued expansion as the wear of the same dictates in order to maintain the desired sealing characteristics thereof.

The above being among the objects of the present invention, the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a view partly in section and partly in elevation of a fragment of an internal combustion engine showing a valve tappet and cam in operative relation relative to the engine and to one another;

Fig. 2 is an enlarged view, partly in elevation and partly in section, of the compensating tappet embodying my invention and shown in Fig. 1;

Fig. 3 is a plan view of the sealing element embodied in the construction illustrated in Fig. 2;

Fig. 4 is a cross-sectional view taken on the line 4—4 of Fig. 3;

Fig. 5 is a view partly in elevation and partly in section similar to Fig. 2, but showing a modified form of sealing means;

Fig. 6 is a plan view of the modified form of a sealing ring shown in Fig. 5;

Fig. 7 is a cross-sectional view taken on the line 7—7 of Fig. 6;

Fig. 8 is a plan view of the washer used in connection with the sealing gasket or ring shown in Fig. 5; and, Fig. 9 is a cross-sectional view taken on the line 9—9 of Fig. 8.

In the construction disclosed in Fig. 1, the valve 1 and cam 2 and their arrangement and construction are conventional. My improvements reside in the construction of the compensating tappet, designed generally by the numeral 3. The hydraulic medium in the form of oil is supplied to the tappet from the lubricating system of the engine and the oil is introduced through a passage 4 into a chamber or conduit 5 provided in the engine block adjacent the tappet guide 6, said tappet guide forming a cover or closure for the pocket in the block. If desired the pocket could be formed in the valve guide and a separate cover provided therefor, as illustrated in Fig. 15 of my above identified application of which the present is a division. A tube or pipe 7 is provided in the passage 4 and extends in a diagonal direction upwardly to a point adjacent the upper wall of the chamber 5, or the passage 4 may lead into the upper part of the pocket and the pipe omitted. The chamber 5 is provided with a gas or air outlet passage 8 extending from its upper end through and near the upper end of the tappet guide 6. The chamber 5 is also provided with another passage 9 leading from its lower portion into the bore of the tappet guide 6, and the tappet guide 6 is provided with a longitudinal groove 10 in its intermediate portion through which oil may pass from the passage 9 upwardly along the inner wall of the guide 6 to a point where it is admitted through suitable openings into the tappet itself, as will be hereinafter explained. As before stated, the oil is passed upwardly through the passage 4 and the tube 7 and spills out of the upper end of the tube into the chamber or conduit 5. This provision of means for introducing the oil into the upper end of the chamber 5 and permitting it to spill therein has the effect of assisting in the separation of gases or air included in the oil at the point of the discharge of the oil from the tube 7. Aerated oil delivered at a point high in chamber 5 will remain in upper portion of the chamber until the air is released therefrom. The gases or air naturally remain in the upper part of the settling chamber 5 and will pass outwardly through the passage 8 into the tappet guide 6 and thence upwardly between the guide and the tappet to escape. Thus the oil in the bottom of the settling chamber 5, which is introduced through the passages 9 and 10 to the tappet, is substantially free of entrapped air or gas which air or gas makes the oil undesirably compressible if carried into the compression chamber of the tappet, i. e., the presence of air or gas in the oil which is used to support the reciprocable plunger of the tappet in its adjusted positions, is very undesirable for the reason that it enables the supporting hydraulic column beneath the plunger to be compressed to a degree which seriously interferes with and sometimes actually prevents the compensating function of the reciprocable plunger, and makes it impossible to accurately regulate the time opening and lift of the valves.

The tappet construction, as shown in Fig. 2, comprises a cylindrical tappet body 15 so formed as to slidably fit in the guide sleeve 6 and provided with an enlarged cam contacting head 16. The cylindrical body 15 is provided with an internal cylindrical bore, as shown, extending substantially the full length of the body. Within this bore is slidably disposed a plunger 17, preferably in the form of a hollow tube throughout its upper portion, and provided with a plug insert 18 at its upper end which is adapted to close the upper end of the body and to contact and support the end of the valve stem, as shown in Fig. 1.

The lower end of the plunger 17 is provided with a projection 19 of reduced diameter. The lower end of this projection is provided with a cylindrical bore 20 which terminates short of the upper end of the projection 19 and which is connected with the internal bore of the main body 17 by a smaller passage 21. The shoulder at the lower end of this smaller passage 21 and the upper end of the bore 20 in projection 19 provides a seat for a valve 22 shown by way of illustration as a ball valve. The ball valve is retained in the bore 20 by means of the cross-pin 23 extending across the base 20 below the ball 22 and secured in the walls of the projection 19.

At the junction of the plunger 17 with the reduced end 19 thereof a beveled shoulder 37 is formed, shown by way of illustration as disposed at an angle of approximately 45° with respect to the axis of the plunger, although this angle may be varied to obtain the desired effect of the sealing ring or gasket hereafter described. A sealing ring 35, shown in detail in Figs. 3 and 4, encircles the projection 19 and relatively closely fits the bore of the body 15 and is provided with a beveled upper face complementary to and which fits the beveled shoulder 37 of the plunger 17. A coiled spring 24 surrounds the projection 19 within the lower end of the bore of the main body portion 15 and bears at its upper end against the lower face of the sealing ring 35 and at its lower end against the bottom of the bore in the body portion 15. The lower end of the spring 24 is preferably slightly larger than the main body portion thereof and preferably is sufficiently tightly received within the lower end of the bore of the body 15 to prevent its rotation therein.

The ring 35 is formed of metal which may be lead or the like or other suitable material and is split at 36 not only in order to permit it to expand and contract radially in operation and also to provide a passage through which oil in the compression chamber under compression may escape to provide a definite leak-down rate for the plunger 17 in the body 15 during operation, but also to allow air to be vented from the compression chamber below the ball valve and well in the lower end of the tappet body 15. Additionally, the co-operation of the inclined upper face of the packing ring 35 and inclined shoulder 37 of the plunger under the force of the spring 24 and the high pressure of the oil in the pressure chamber acting on its lower face results in a wedging action during the compression stroke of the plunger which not only frictionally resists the downward movement of the plunger in the body but also increases the efficiency of the seal. As will be understood the width of the gap 36 in the sealing ring 35 controls the leak-down rate while the angle of the shoulder 37 primarily controls the desired pressure of the packing ring upon the wall of the bore in the body 15, and these may be varied to obtain any desired result.

The body 15 is provided with an annular groove or recessed portion 28 around its intermediate portion and with oppositely disposed passages 29 which lead from the upper portion of this recess to the interior of the tappet body. The plunger 17 is provided with an annular recess 30 in its intermediate portion and with passages 31 leading from the recess 30 to the hollow interior of the plunger. Oil is introduced into the plunger through the recess 28, passage 29, recess 30 and passage 31, where it falls to the bottom of the plunger against the ball valve 22 and as the plunger is raised relative to the tappet body 15 and the pressure relieved beneath the ball 22, the oil will flow down past the ball into the lower part of the tappet body 15 and into the compression chamber there provided between the end of the plunger and the tappet body. It is desirable that the plunger 17 does not follow up a stuck valve 1 too far and to this end, the groove 30 may be of only sufficient width to allow for the desired adjustment of the tappet and shuts off the supply of oil when the plunger moves in excess of the amount necessary for normal adjustment. The spring 24 is compressed from free length only the amount required for adjustment thus causing the plunger to follow up a stuck valve only a limited distance.

During the operation of the engine some of the oil in the compression chamber in the lower part of the tappet will leak outwardly through the gap 36 in the sealing ring 35 and then upwardly between the plunger and the tappet body, and as this occurs the leakage will be replaced through the ball valve 22 by the oil in the upper portion of the plunger. The spring 24 acts constantly during the intervals when the valve 1 is on its seat to force the plunger 17 upwardly against the valve stem to eliminate any clearance between the two, and any movement of the plunger 17 outwardly of the tappet body 15 will reduce the pressure in the chamber or space between the end of the plunger and the end of the bore in the tappet body and so permit the ball valve 22 to fall away from its seat by its own weight and admit sufficient oil into the compression chamber beneath the plunger to maintain the plunger in its adjusted position.

During operation, the hollow interior of the plunger 17 will be filled with oil substantially to the intake opening 31. This body of oil is not used immediately. Consequently air or gas included therein has the opportunity to work to the upper surface and to escape through the vent openings 32, and the oil entering the compression chamber beneath the plunger is taken from the bottom of the reservoir in the plunger which will immediately be most free from air or gas. This feature is of further importance in that it provides a constant reservoir of oil which is immediately available for induction into the compression chamber beneath the plunger upon the starting of the engine so that the automatic adjustment may be immediately obtained upon starting even though the engine has not been running for a considerable time.

In the modification shown in Figs. 5, 6, 7, 8 and 9 I have provided a seal of slightly different kind than that shown in Figs. 2, 3 and 4. The packing ring 38 here shown is of an impressible or compressible material. It is not split or divided and may be of lead or other suitable metal of relatively high ductility. It is retained in place by means of a metal washer 39 which bears against its underside and is in turn supported by the upper end of the coil spring 24. This type of packing ring tends to pack and be expanded between the plunger and the tappet body by the pressure of the spring 24 and the oil in the pressure chamber and to become more dense with use and consequently provide a more effective seal. The angle 37' between the sealing ring 38 and the plunger may be varied to regulate the wall pressure of the ring and the leak-down rate on this type of lifter is made substantially constant by providing a small opening 40 through the wall of the tappet body just below the ring 38. This opening is masked by the tappet guide.

Formal changes may be made in the specific embodiment of the invention described without departing from the spirit and substance of the broad invention, the scope of which is commensurate with the appended claims.

What is claimed is:

1. A hydraulic valve tappet comprising, in combination, a cylindrical body provided with a longitudinal bore, said body being closed at one end and open at the other, a plunger disposed in said bore and in conjunction with said cylindrical body defining the hydraulic compression chamber between the plunger and the closed end of said cylindrical body, said cylindrical body adapted to receive a liquid therein, means providing for relatively free flow of said liquid past said plunger in said bore in one direction only, and resilient means for extending said plunger outwardly with respect to said cylindrical body, means including a washer-like element of ductile metal providing a seal between the plunger and cylindrical body for substantially preventing flow of liquid out of said hydraulic compression chamber and means providing for a definite and predetermined escapement of liquid out of said hydraulic compression chamber.

2. A valve tappet comprising a cylinder having a fluid reservoir therein, a plunger slidably mounted in the cylinder for movement toward and away from the reservoir, and a continuous sealing ring movable with the plunger and having a periphery of ductile metal engageable with the cylinder walls to resist the escape of fluid from the reservoir past the plunger in one direction, and means providing for the relatively free flow of fluid past said plunger in the opposite direction, to said reservoir.

3. A valve tappet comprising a cylinder having a fluid reservoir at one end, a plunger having a body portion slidably engageable with the cylinder walls, a seal comprising a member movable with the plunger and positioned at the end of the plunger body adjacent the reservoir, said member having a circular outer edge portion of ductile metal slidably engaging the cylinder walls throughout the circumference thereof to prevent the escape of fluid from the reservoir to the space between the cylinder walls and plunger body, and means providing a by-pass through the member to the space between the cylinder walls and plunger body.

4. A valve tappet comprising a cylinder having a reservoir therein, a plunger having a body slidably engaging the side walls of the cylinder, a seal comprising a member positioned at the end of the plunger body adjacent the reservoir and movable with the plunger, said member having a circular edge portion engageable with the cylinder wall throughout the circumference thereof and being formed of a metal possessing the ductility required to provide for spreading of the member under the action of pressure applied to the member in the general direction of the plunger to intimately engage the circular edge of the member with the cylinder walls, and means providing for the relatively free flow of liquid in said cylinder past said plunger in one direction only.

5. A valve tappet comprising a cylinder having a fluid reservoir therein, a plunger having a body portion slidably engageable with the cylinder walls, a seal positioned at the end of the plunger adjacent the reservoir and movable with the plunger, said seal comprising a member of ductile metal having a circular outer edge frictionally engaging the cylinder walls and engaged between axially spaced and relatively axially movable parts of rigid metal whereby to be responsive to the application of pressure on the member in the general direction of movement of the plunger to effect spreading of the member and insure a continuous circumferential engagement of the outer circular edge of the member with the cylinder walls, and means associated with said plunger providing for the relatively free flow of liquid into said cylinder past said plunger in one direction only.

6. A valve tappet comprising, in combination, a body provided with a longitudinal bore, said body being closed at one end and open at the other, a plunger disposed in said bore, resilient means cooperating between said body and plunger normally urging said plunger outwardly of said bore whereby to increase the effective length of said tappet, means including a yieldable element of ductile metal carried by said plunger so constructed and arranged as to tend to be expanded into contact with the wall of said bore when said tappet is subjected to compressive forces tending to shorten it, means providing for the substantially free flow of liquid in said bore past said plunger to the space between said plunger and the closed end of said bore, and means providing for a limited escape of liquid from the space between said plunger and the closed end of said bore.

7. A hydraulic valve tappet comprising, in combination, a body provided with a blind bore therein adapted to receive a liquid, a plunger disposed in said bore defining a hydraulic compression chamber in said body between its inner end and the closed end of said bore, resilient means cooperating between said body and plunger for urging said plunger outwardly of said bore, means providing for relatively free flow of liquid in said bore past said plunger to said compression chamber, means including an element of ductile metal carried by said plunger and in contact with the wall of said bore, said element being confined against axial expansion and tending to expand radially into contact with the wall of said bore when said tappet is subjected to compressive forces tending to shorten it, and means providing for a limited escape of liquid from said compression chamber.

8. A hydraulic valve tappet comprising, in combination, a body provided with a blind bore therein adapted to receive a liquid, a plunger disposed in said bore defining a hydraulic compression chamber in said body between its inner end and the closed end of said bore, resilient means cooperating between said body and plunger for urging said plunger outwardly of said bore, means providing for relatively free flow of liquid in said bore past said plunger to said compression chamber, means including a yieldable but substantially incompressible element composed of highly ductile metal substantially confined by said plunger, said hydraulic compression chamber and said body for causing a lagging or retardation in movement of said plunger relative to said body during the application of compressive forces acting on said tappet and tending to shorten it, and means providing for a limited escape of liquid from said compression chamber.

CARL VOORHIES.